Figure 7:
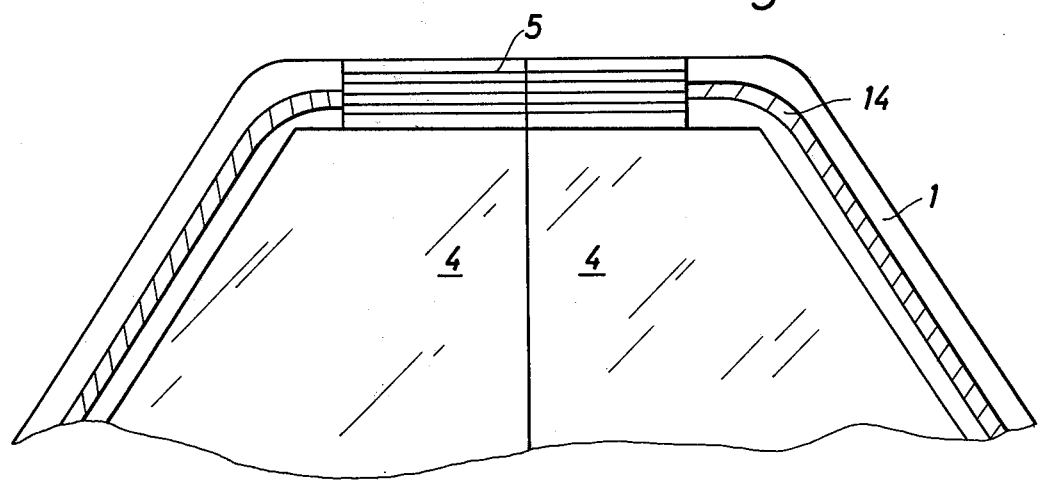

United States Patent [19]

Larsen et al.

[11] 4,325,404

[45] Apr. 20, 1982

[54] VALVE CLAW TO BE SITUATED AT THE END OF A PIPE TO MOUNT A CLOSING VALVE

[76] Inventors: Peder M. Larsen, Hovedvagtsgade 6, 3.,, DK-1103 Copenhagen K.; Uffe M. Larsen, Soborg Hovedgade 74, DK-2860 Soborg, both of Denmark

[21] Appl. No.: 68,738

[22] Filed: Aug. 22, 1979

[30] Foreign Application Priority Data

Aug. 30, 1978 [DK] Denmark .................... 3822/78

[51] Int. Cl.³ .................... F16K 51/00; F16L 37/28
[52] U.S. Cl. .................... 137/316; 251/152; 251/1 R; 285/18; 285/23
[58] Field of Search .............. 251/1 R, 147, 1 A, 1 B, 251/148, 152; 285/141, 18, 23, 306, 388, DIG. 1; 166/339, 340, 344; 92/21 MR, 27, 23, 28, 21 R; 137/316

[56] References Cited

U.S. PATENT DOCUMENTS

| | | | |
|---|---|---|---|
| 151,548 | 6/1874 | Schmitz | 251/147 |
| 1,802,565 | 4/1931 | Locey | 251/1 R |
| 1,839,393 | 1/1932 | Inge | 251/1 R |
| 2,109,546 | 3/1938 | McLagan | 285/144 X |
| 2,230,725 | 2/1941 | Nathan | 285/383 X |
| 2,596,805 | 5/1952 | Banker | 251/147 |
| 2,647,533 | 8/1953 | Beymer | 251/147 |
| 2,846,178 | 8/1958 | Minor | 251/1 B |
| 3,084,898 | 4/1963 | Miller | 251/1 R |
| 3,323,773 | 6/1967 | Walker | 251/1 B |
| 3,438,608 | 4/1969 | Wood | 251/147 |
| B 3,541,710 | 2/1976 | Williams | 251/1 B |
| 3,591,125 | 7/1971 | Lewis | 251/1 B |
| 3,667,721 | 6/1972 | Vujasinovic | 251/1 B |
| 3,802,466 | 4/1974 | Panella | 138/89 |

FOREIGN PATENT DOCUMENTS

| | | |
|---|---|---|
| 2030859 | 1/1971 | Fed. Rep. of Germany . |
| 2247804 | 9/1972 | Fed. Rep. of Germany . |
| 2650775 | 5/1978 | Fed. Rep. of Germany . |

*Primary Examiner*—A. Michael Chambers
*Attorney, Agent, or Firm*—Cushman, Darby & Cushman

[57] ABSTRACT

A coupling for attachment to the end of a pipe comprising: a tubular housing open at opposite ends, one end being adapted to fit over the outside of a pipe end to which the coupling is to be attached and the other end being adapted to have a valve connected thereto; a clamping device within said housing for clamping the housing to the outside of the pipe end, the device including a plurality of circumferentially-arranged tapered radially adjustable segments and a mechanism for moving the segments radially inward into edge-to-edge abutment with each other so as to form a frusto cone having its larger end facing the pipe end, each segment at its wider end being in sliding sealing engagement with the inner surface of the housing and each segment at its smaller end having at least one gripping surface which faces radially inward so as to form a circumferentially continuous gripping surface when the segments are in their radially inward position, there being a space between the outer surfaces of the segments and the inner surface of the housing, which space is in communication with the open end of said housing facing away from the pipe end.

10 Claims, 7 Drawing Figures

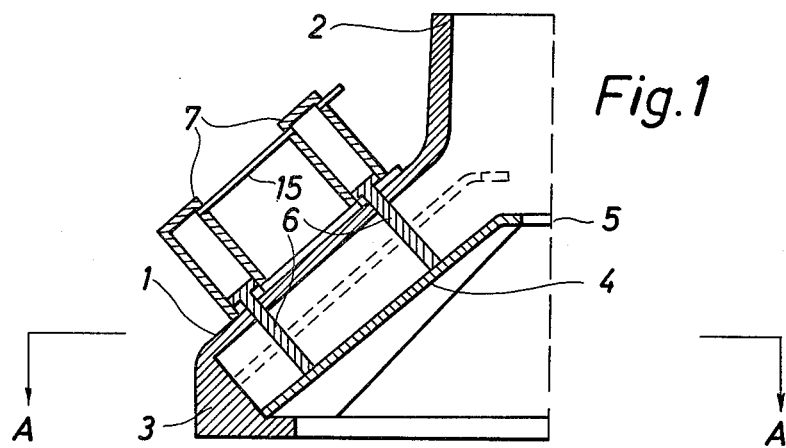
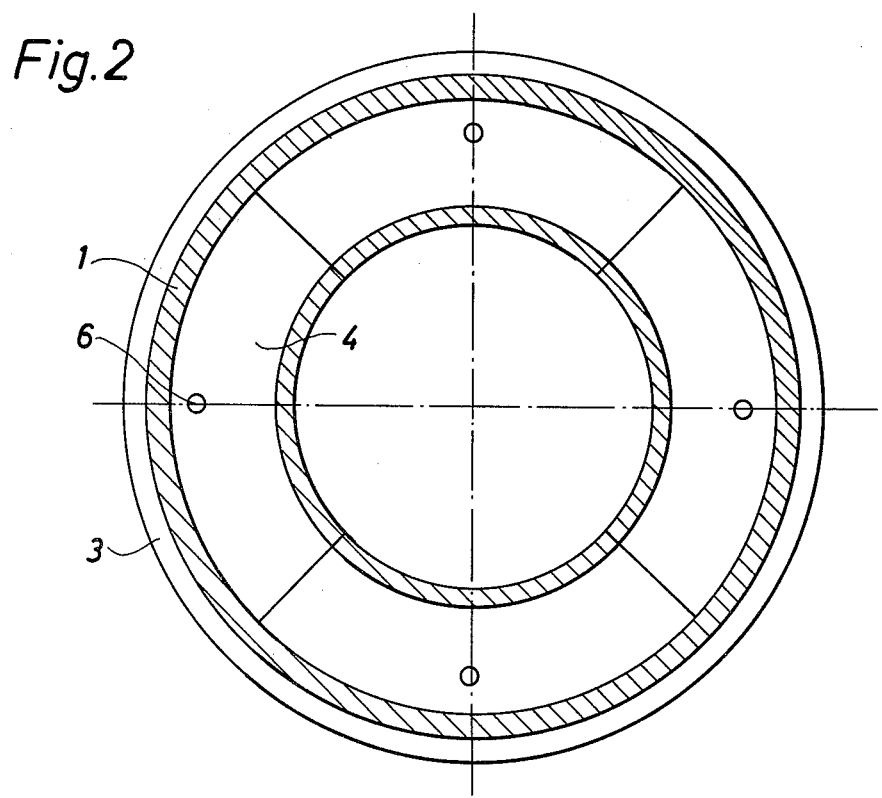

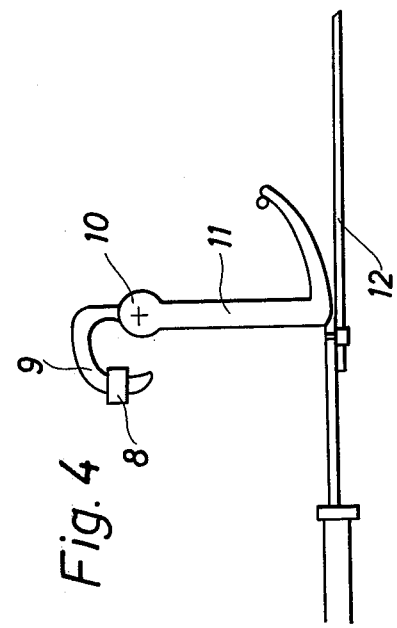
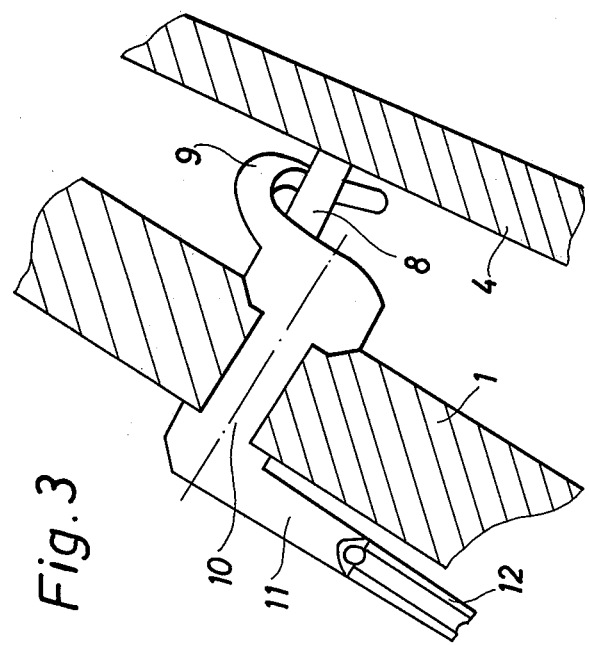

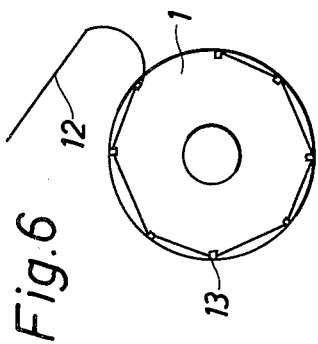
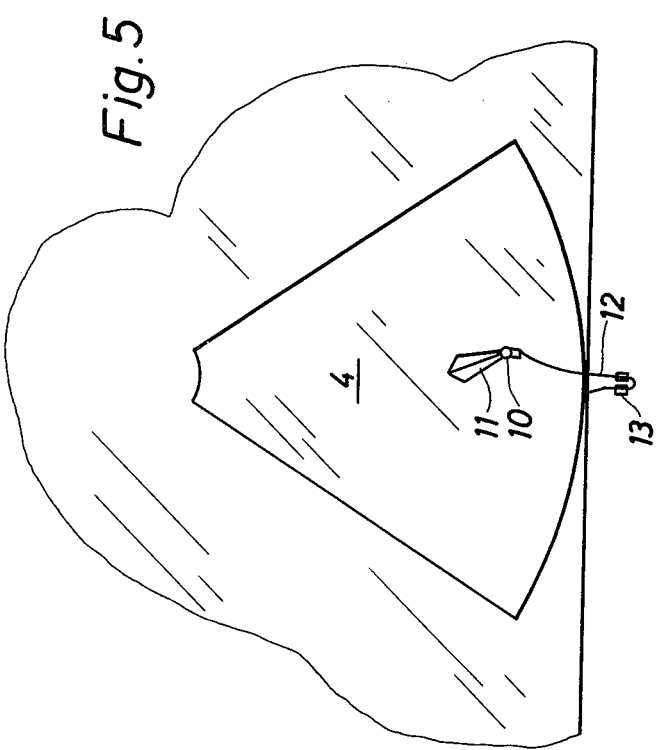

VALVE CLAW TO BE SITUATED AT THE END OF A PIPE TO MOUNT A CLOSING VALVE

The invention relates to a coupling comprising a housing to be situated at the end of a pipe to mount a closing valve located on a pipe stub on the housing, there being circumferential radially movable teeth carried within the housing, which teeth by means of tightening means may abut the pipe outside of the wall and through friction and/or by grasping fix the coupling to the pipe with the co-operation of the pressure in the liquid or the gas within the interior of the pipe when said closing valve is tightened.

In case of heavy leaks of liquid or gas from open pipe ends, e.g. by a so-called blow out on a drilling platform whereby there is no other way of stopping the medium flowing through the pipe, it may be very difficult or even impossible to mount a closing valve at the end of the pipe in order to stop the medium gushing out.

It is known to utilize the pressure of the medium in a pipe for pressing a gasket in a pipe connection tightly against a pipe wall. Furthermore, it is known from German Offenlegungsschrift No. 2,247,804 to maintain an end stop provided with a pipe stub having a closing valve pressed against the pipe mouth with the co-operation of the pressure within the interior of the pipe. This end stop forms a plug at the end of the pipe and comprises a circular groove receiving the pipe end in such a manner that clamping and gasket rings radially movable in circumferential grooves in the end stop may be pressed in radial direction towards the outer and inner side of the pipe wall when influenced by a pressure medium of an exterior pressure source and with co-operation of the pressure within the gas or liquid in the pipe. This coupling is for instance well suited for pressure tests of pipes. However, such a coupling cannot be mounted on the pipe when liquid or gas gushes out at a high velocity and under high pressure.

The object of the invention is to provide a coupling of the above type, which in an easy and quick manner may be mounted at the end of a pipe, from where liquid or gas gushes out under high pressure.

The coupling according to the invention is characterized in that it includes a housing which is formed as a bell or a cone opened at the ends and at the spigot end of which a pipe stub is centrally situated, and that in conical surface segments within the housing are connected to tightening means and are radially movable within the housing. At one end the segments sealingly join the inside of a rim portion at the wide end of the bell and at their opposite end carry claws or the teeth, by means of which they may clutch about the outside of a pipe. The space between the inside of the housing and the outside of the conical surface segments is in open communication with the pipe stub.

Such a coupling may be shaped with a pipe stub having an external diameter sufficiently large for permitting a relatively easy mounting about the pipe end. Then the coupling may by means of the tightening means be temporarily fixed to said pipe end as the claws are pressed against the outside of the pipe. As the closing valve is being closed the pressure within the flowing medium is transmitted to the top side of the segments and the more the valve is closed the more said pressure presses the segments against the pipe wall. Subsequently, the coupling may be permanently pressed against the pipe by means of this pressure, and above the closing valve it may be coupled to existing installations.

The tightening means may according to the invention be hydraulic or pneumatic cylinder-piston aggregates, the cylinder of which is located on the outside of the housing, and the piston rods of which are connected to the segments. In this manner the tightening may be remote-controlled at a sufficient safety distance from the pipe with the medium gushing out. When the coupling is fixed by means of the pressure therein, pipe hoses for the cylinders may be removed whereby they do not prevent further work, e.g. on a drilling platform.

According to the invention each conical surface segment is preferably connected to two piston rods secured to the same generatrix on the conical surface, whereby they may perform a translational movement radially towards the pipe and correctly clutch about said pipe by means of the claws on the interior rims of the segments.

The segments preferably extend along a conical surface the vertial angle of which is larger than the vertical angle of the housing, whereby a predetermined wedge effect arises when the segments are pressed against the pipe wall by the medium gushing out of said pipe.

In order to facilitate the mounting and the storing of the coupling, each conical surface segment may according to the invention on the outside comprise an eye or a corresponding fastening means, in which a hook on a shaft pivotally embedded in the housing may engage, said shaft on the outside of the housing carrying a control arm located perpendicular to the arm. When the control arm is turned the hooks disengage the corresponding eyes, whereby the segments may be released from the wall of the housing without difficulties. This releasing of the segments is permitted by a pull in a wire surrounding the outside of the housing and connected to the control arms.

The claw may in a simple and inexpensive manner be formed as circumferential locking grooves provided with intermediate, sharp edged teeth or ribs on an axial edge surface on each conical surface segment.

The invention will be described below with reference to the accompanying drawing, in which FIG. 1 is an axial, sectional view through a part of the coupling according to the invention, FIG. 2 is a sectional view of the coupling perpendicular to its longitudinal axis at the level of the line A—A of FIG. 1, FIGS. 3 and 4 illustrate details of a locking device for locking a conical surface segment to the housing when unemployed, FIGS. 5 and 6 illustrate how a pull wire for releasing the locking device may be located, and FIG. 7 illustrates a detail showing the claws at the narrowest end of the coupling.

The coupling illustrated in the drawing comprises a conical housing 1 extending at the top into a pipe stub 2 and at the bottom into a wide rim portion 3, whereby said housing is open at both ends. Four conical surface segments 4 are mounted in the housing. Each conical surface segment is at two points along a common generatrix through the middle of the segment connected to two piston rods 6 displaceable in hydraulic or pneumatic cylinders 7 secured on the outside of the housing 1. As a result each segment 4 may by means of the piston-cylinder mechanisms 6, 7 perform a translational movement in radial direction within the housing while it at the lowest end sealingly engages a surface in the rim portion 3 of the housing. At the opposite end each segment 4 is curved inwards in such a manner that the segments together form an axial rim surface shaped with circumferential locking grooves with intermediate, sharp edged teeth or ribs forming claws 5.

When it is desired to stop a heavy, uncontrolled leak of liquid or gas from the open end of a pipe not shown, the housing with the pipe stub 2 in advance provided with a closing valve is carried an appropriate distance downwards about the pipe end and secured to said pipe end by actuating the piston-cylinder mechanisms 6, 7 in such a manner that they press the conical surface segments 4 inwards. Thereby the claws or teeth 5 may engage the outside of the pipe along the entire periphery thereof, whereby the segments act as tightening means. When the closing valve mounted on the pipe stub 2 subsequently is slowly closed, the pressure within the pipe with the medium gushing out through the pipe stub 2 is transmitted to the space between the wall in the housing 1 and the segments 4. When the valve then is further closed, the pressure increases in such a manner that the claws or teeth 5 are heavily pressed against the pipe wall and fix the housing 1 permanently. Subsequently, pressure hoses 15 feeding pressure medium to the cylinders 7 during the first part of the mounting are removed and do not prevent further work, e.g. in connection with coupling of the closing valve to existing installations.

Although the embodiment illustrated comprises four conical surface segments 4, it is to be understood that an arbitrary number of segments may be employed, which when tightened about the pipe to be closed are arranged close together, e.g. with gaskets 14, cf. FIG. 7. Furthermore, it is to be understood that in stead of hydraulic or pneumatic tightening means for the first tightening of the segments about the pipe, mechanical tightening means may also be used. However, the movement of the segments by means of hydraulic means is advantageous since said movement may easily be remote-controlled at a safe distance from the pipe with the medium gushing out.

During the storing and the first part of the mounting the segments 4 are preferably locked to the inside of the wall of the housing 1. Such a locking may be provided in the manner diagrammatically indicated in FIGS. 3 to 6. On the outside each conical surface segment 4 comprises an eye 8, and in the wall of the housing 1 a shaft 10 is mounted. At one end this shaft carries a hook 9 engageable in the eye, and at the opposite end it carries a control or pull arm 11 rendering it possible for the hook to disengage the eye when the segment is to be released. The segments 4 may be quickly released through a pull in a wire 12 connected to all the control arms 11 and extending along the periphery of the housing in pulleys 13, cf. FIG. 6. FIG. 5 illustrates this form of locking, seen in a direction towards a segment 4, whereby the top of the housing 1 has been removed.

FIG. 7 illustrates how an axial rim surface of the wall of the housing 1 is shaped with circumferential, sharp edged teeth 5, and furthermore how the segments 4 are arranged close together when mounted on a pipe with the outer dimension, for which the coupling is intended to be used.

It is to be understood, that many modifications may be performed without deviating from the scope of the invention. The tightening of the segments may for instance be performed by means of a single piston-cylinder mechanism, whereby the segments in stead of being translationally displaceable are pivotally mounted at their lowest end rims. However, then a more complicated embodiment of the housing is necessary. Furthermore, the tightening means may be adapted in various manners, e.g. as pressure or pull-transmitting, mechanically controlled means.

We claim:

1. A coupling for attachment to the end of a pipe, said coupling comprising: a generally bell-shaped housing open at its larger end so as to be adapted to fit over the end of the pipe; a pipe stub connected to the other end of the housing for receiving a closing valve, said pipe stub being in communication with the interior of the housing; a plurality of circumferentially-arranged radially movable conical segments within the housing which abut each other in edge-to-edge relationship along the whole extent of their edges when in their radially inward position; means for moving the segments radially inwardly to their abutting position; the segments having wide ends in sliding sealing engagement with the inner surface of the housing and each segment having a narrow end provided with at least one circumferentially gripping edge which faces radially inwardly for sealingly engaging and gripping the whole of the circumference of the pipe when the segment is in its radially inward position, there being a space between the inner surface of the housing and the outer surfaces of the segments, which space is in communication with the pipe stub whereby when the housing is secured to the outside of the pipe by the gripping edge on the segments any fluid pressure created by fluid escaping from the pipe will act on the outer surface of the segments so as to hold the gripping edge in engagement with the outside of the pipe.

2. A coupling as in claim 1 wherein said means for moving said segments radially inward includes at least one fluid-operated cylinder and piston unit for each of said segments, said cylinders being arranged on the outside of said housing.

3. A coupling as in claim 2 wherein there are two cylinder and piston units associated with each segment, each of said units having a piston rod secured to the respective segment.

4. A coupling as in claim 3 wherein said housing has a conical inner surface and wherein the angle between the segments and the axis of said housing is greater than the angle between said inner conical surface and said axis.

5. A coupling as in claim 8 including means for releasably holding each of said segments in radially outward positions, said means including, for each segment, a shaft journalled in the wall of said housing, said shaft having an inner end provided with a hook which is engageable with a cooperating element on the respective segment and a control arm secured to said shaft for rotating the latter so as to selectively engage and disengage said hook with said cooperating element, said arm being located outside said housing.

6. A coupling as in claim 5 wherein said releasable holding means further includes a wire connected to all said control arms in a manner such that a pull on said wire moves all said hooks out of engagement with the corresponding cooperating elements.

7. A coupling as in claim 1 wherein the gripping edge of the narrow end of each segment is formed by a plurality of axially spaced apart grooves with intermediate sharp-edged teeth.

8. A coupling comprising: a tubular housing open at opposite ends, one end being adapted to fit over the outside of a pipe end to which the coupling is to be attached and the other end being adapted to have a valve connected thereto; means within said housing for clamping the housing to the outside of a pipe end, said means including a plurality of circumferentially-arranged tapered radially adjustable segments and means for moving said segments radially inward into edge-to-edge abutment along the whole extent of their edges with each other so as to form an imperforate frusto cone having its larger end facing said one end of said housing, each segment at its wider end being in sliding sealing engagement with the inner surface of said housing and each segment at its smaller end having at least one gripping surface which faces radially inward so as to form a circumferentially continuous gripping surface adapted to grip the whole of the circumference of the pipe when the segments are in their radially inward position, there being a space between the outer surfaces of said segments and the inner surface of said housing, which space is in communication with said other open end of said housing whereby when the housing is secured to the outside of the pipe by the gripping surface on the segments any fluid pressure created by fluid escaping from the pipe will act on the outer surfaces of the segments so as to hold the gripping surface in engagement with the outside of the pipe.

9. A coupling as in claim 8 wherein said means for moving said segments includes, for each segment, at least one fluid-operated cylinder and piston unit carried on the outside of said housing, each unit having a piston rod secured to the respective segment.

10. A coupling as in claim 9 including releasable latching means carried by said housing and engageable and disengageable with each of said segments to releasably hold the segments in their radially outward position.

* * * * *